United States Patent
Bantz et al.

(10) Patent No.: US 7,212,975 B2
(45) Date of Patent: May 1, 2007

(54) APPARATUS AND METHODS FOR PROVIDING AN ESTIMATED TIME OF ARRIVAL BASED MARKETPLACE

(75) Inventors: David Frederick Bantz, Chappaqua, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 09/788,059

(22) Filed: Feb. 16, 2001

(65) Prior Publication Data

US 2002/0116202 A1 Aug. 22, 2002

(51) Int. Cl.
G06Q 99/00 (2006.01)

(52) U.S. Cl. .................. 705/1; 705/26; 705/2; 705/14; 705/10; 705/4; 705/37; 455/434; 455/62; 455/435.2; 707/3; 707/104.1; 707/10; 709/203; 709/219; 379/114

(58) Field of Classification Search ............... 705/1, 705/37, 8, 26, 27, 2, 10, 14; 379/266.01, 379/209.01, 265.02, 114; 455/434, 435.2, 455/62; 707/3, 10, 104; 709/203, 219
See application file for complete search history.

(56) References Cited

U.S. PATENT DOCUMENTS

| | | | |
|---|---|---|---|
| 5,797,133 A * | 8/1998 | Jones et al. ................. 705/38 |
| 5,884,157 A * | 3/1999 | Karmi ....................... 455/406 |
| 6,026,375 A | 2/2000 | Hall et al. |
| 6,112,181 A | 8/2000 | Shear et al. ................. 705/1 |
| 6,310,952 B1 * | 10/2001 | Baldwin et al. ....... 379/266.01 |
| 6,324,476 B1 | 11/2001 | Trovato |
| 6,519,570 B1 * | 2/2003 | Fader et al. ................. 705/8 |
| 6,622,131 B1 * | 9/2003 | Brown et al. ............... 705/38 |
| 6,691,094 B1 * | 2/2004 | Herschkorn ................. 705/37 |
| 6,926,203 B1 | 8/2005 | Sehr |
| 2001/0051913 A1 * | 12/2001 | Vashistha et al. ............ 705/37 |
| 2001/0056396 A1 * | 12/2001 | Goino ....................... 705/37 |
| 2002/0077876 A1 | 6/2002 | O'Meara et al. |
| 2003/0195698 A1 | 10/2003 | Jones |

* cited by examiner

FOREIGN PATENT DOCUMENTS

WO WO 9427264 A1 * 11/1994

OTHER PUBLICATIONS

Johnson, Amy Helen Desktop Delivery © 1998 Windows Magazine Apr. 1998, p. 208. http://www.techweb.com/winmag/library/1998/0401/featu101.htm.*

*Primary Examiner*—James A Reagan
(74) *Attorney, Agent, or Firm*—Duke W. Yee; Lisa M. Yamonaco; Lisa L.B. Yociss

(57) ABSTRACT

Apparatus and methods for providing an estimated time of arrival based marketplace are provided. The apparatus and methods solicit bids from one or more service providers for a requested service. The service providers may respond with bids that may include a price for providing the requested service along with an estimated time to perform the requested service in a location associated with the service provider. The bids are used, along with travel data obtained from a travel data provider, to generate service search results that are provided to a client device. The service search results include the price charged by the service provider as well as estimated times of completion (ETAs) for obtaining the service from the service provider. The ETA may be a combination of travel time determined from the travel data and time of performance determined from the bid submitted by the service provider. The service search results may further include a service provider rating that provides an indication as to the accuracy of the ETAs. From the service search results, a user of the client device may submit an order for having a particular service provider from the service search results provide the requested service.

18 Claims, 5 Drawing Sheets

APPARATUS AND METHODS FOR PROVIDING AN ESTIMATED TIME OF ARRIVAL BASED MARKETPLACE

TECHNICAL FIELD

The present invention is directed to an improved distributed computer system. More particularly, the present invention provides apparatus and methods for providing an estimated time of arrival based marketplace.

DESCRIPTION OF RELATED ART

Electronic marketplaces on the Internet are becoming more prevalent. These electronic marketplaces provide a central location through which goods and service providers may be accessed. Through these electronic marketplaces, a user may obtain information about the goods and service providers, the goods and services provided, as well as place orders for the goods and services.

In addition, some electronic marketplaces provide an ability to perform a search of goods and service providers for a desired item or service. Still other electronic marketplaces allow a user to solicit bids from goods and services providers for providing a desired good or service to the user. These bids typically are focused entirely on the cost of the good or service to the user. That is, service providers compete by placing bids based entirely on the cost of the good or service to the user. The cost of the good or service may not be the only criteria that is important to the user when selecting a provider of the good or service.

Among the many attributes of a service that a potential customer may consider important is the immediacy with which that service can be delivered. In some cases, a service is not valuable at all if it is not delivered within a particular window of time. In other cases, the services that can be delivered sooner have incremental value over those that can be delivered later. An example of such a service is food delivery.

Moreover, there are many situations for which the time of arrival of service delivery is an important differentiator between service providers. Local providers may be able to satisfy a service need more quickly than others. Service providers with lower load factors may be able to produce a product faster than others. However, with current marketplace systems, these service providers are forced to compete with larger service providers, with greater economies of scale, that may not produce a product as fast or deliver a service as quickly as the local providers, on price alone.

Thus, it would be beneficial to have apparatus and methods for providing an estimated time of arrival based marketplace through which a customer may be informed of estimated times of completion of a service in addition to price.

SUMMARY OF THE INVENTION

The present invention provides apparatus and methods for providing an estimated time of arrival based marketplace. The apparatus and methods solicit bids from one or more service providers for a requested service. The service providers may respond with bids that may include a price for providing the requested service along with an estimated time to perform the requested service in a location associated with the service provider.

The bids are used, along with travel data obtained from a travel data provider, to generate service search results that are provided to a client device. The service search results include the price charged by the service provider as well as estimated times of completion (ETAs) for obtaining the service from the service provider. The ETA may be a combination of travel time determined from the travel data and time of performance determined from the bid submitted by the service provider.

The service search results may further include a service provider rating that provides an indication as to the accuracy of the ETAs. From the service search results, a user of the client device may submit an order for having a particular service provider from the service search results provide the requested service.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
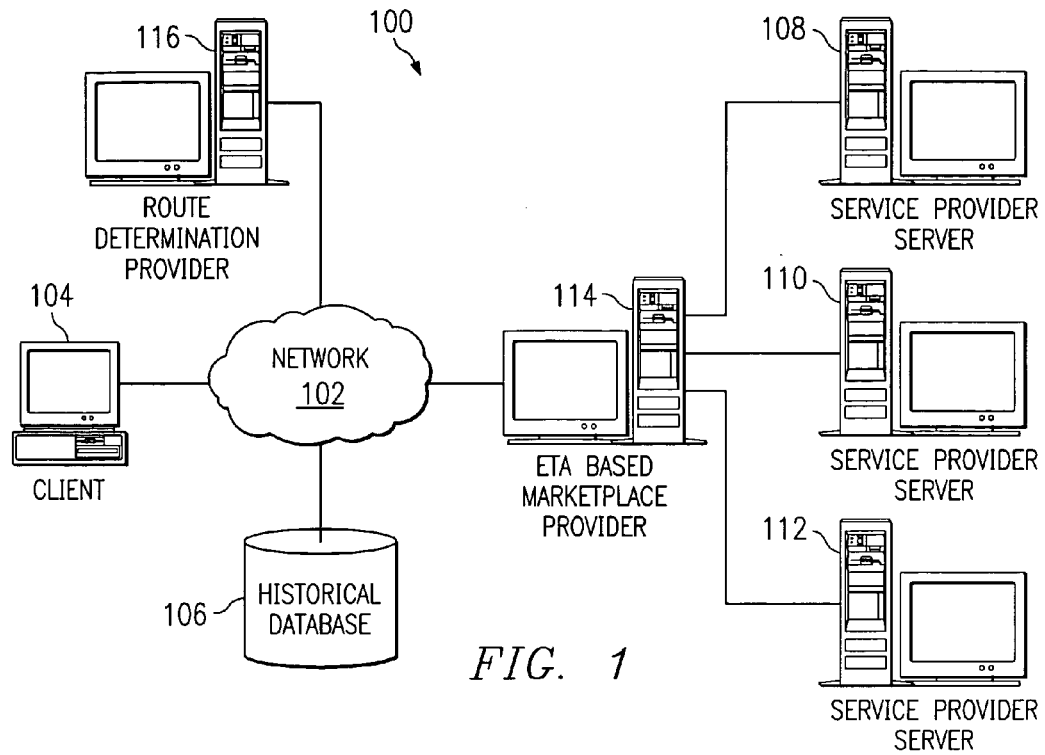
FIG. 1 is an exemplary block diagram illustrating a network data processing system according to one embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, service provider servers 108–112 are connected to network 102 along with Estimated Time of Arrival (ETA) Marketplace provider 114.

In addition, client 104 is also connected to network 102. The client 104 may be, for example, a personal computer, network computer, personal digital assistant, portable computing device, or the like. In the depicted example, service provider servers 108–112 provide data, such as files, web pages, operating system images, and applications to client 104. Client 104 is a client to service provider servers 108–112 and ETA based marketplace provider 114.

Network data processing system 100 may include additional servers, clients, service providers and other devices not shown. For example, the network data processing system 100 may include a route determination provider 116 and a historical database 106. The route determination provider 116 provides functionality to determine a travel route between a physical location associated with the client 104 and a physical location associated with the service provider servers 108–112. By being in "association with" the client 104 or service provider servers 108–112 what is meant is that the client 104 and service provider servers 108–112 need not necessarily be located at the physical location but must have some relationship to a physical location that is ascertainable and able to be used to generate route information.

The historical database 106 provides data corresponding to travel conditions of a route determined by the route determination provider 116. Such travel condition data may include congestion information, detour information, accident information, travel delays at various times of day, and the like. While the historical database 106 and the route determination provider 116 are depicted as separate devices coupled to the network 102, these devices maybe incorporated with one another, incorporated into ETA based marketplace provider 114, be directly accessible by the ETA based marketplace provider 114 without having to route through network 102, or the like.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The ETA based marketplace provider 114, as will be described in more detail hereafter, provides a mechanism for requesting and accepting bids for a service from service provider servers 108–112. The ETA based marketplace provider 114 may be, for example, an electronic business (e-business) marketplace that provides access to one or more service providers. The ETA based marketplace provider 114 has a registration of service providers which provides various information regarding the service providers, including the types of services provided, associated physical locations, address information, and the like. The ETA based marketplace provider 114 thus, acts as a "virtual shopping mall" for the registered service providers by providing a single interface through which a user of a client device may gain access to a plurality of registered service providers.

The concept of an electronic marketplace or electronic shopping mall is generally known in the art. Such marketplaces may be specific to a particular type of good or service offered, such as a jewelry retailer marketplace, or may be more diversified and have service providers offering a variety of different services. The present invention builds on known electronic marketplaces by providing a mechanism by which a user of a client device may be provided with estimated ETA information and service provider ratings that allow the user to make a more informed decision about which service provider to choose.

In the present invention, the ETA based marketplace provider 114 receives a request for service bids from the client 104, solicits bids from service provider servers 108–112, determines ETA estimates for providing the requested service from the responding service provider servers 108–112, determines a service provider rating for the responding service provider servers 108–112, and transmits search results to the client 104 identifying the responding service provider servers 108–112, their ETAs and a corresponding service provider rating. The ETA based marketplace provider 114 may be implemented, for example, on a proxy server to which the client 104 is logged on, may be implemented as an application on the client 104, or as a network-resident service implemented by a proxy that resides on a service provider's premises through which servers 108–112 are accessed, or the like.

Proxy servers are generally known in the art and are available for common Internet services. For example, an HTTP proxy is used for Web access, and an SMTP proxy is used for e-mail. Proxy servers generally employ network address translation (NAT), which presents one organization-wide IP address to the Internet.

In the case of the ETA based marketplace provider 114 being implemented on the client 104, the ETA based marketplace provider 114 may be a stand alone software application, a portion of a web browser application, a plug-in to a web browser application, or the like. For purposes of illustration, it will be assumed in the following description that the ETA based marketplace provider 114 is implemented on a proxy server. The proxy server is present between the client and the server, and may either be logged onto by the client or a proxy of a service provider through which access to the servers 108–112 is obtained.

Figure 2:
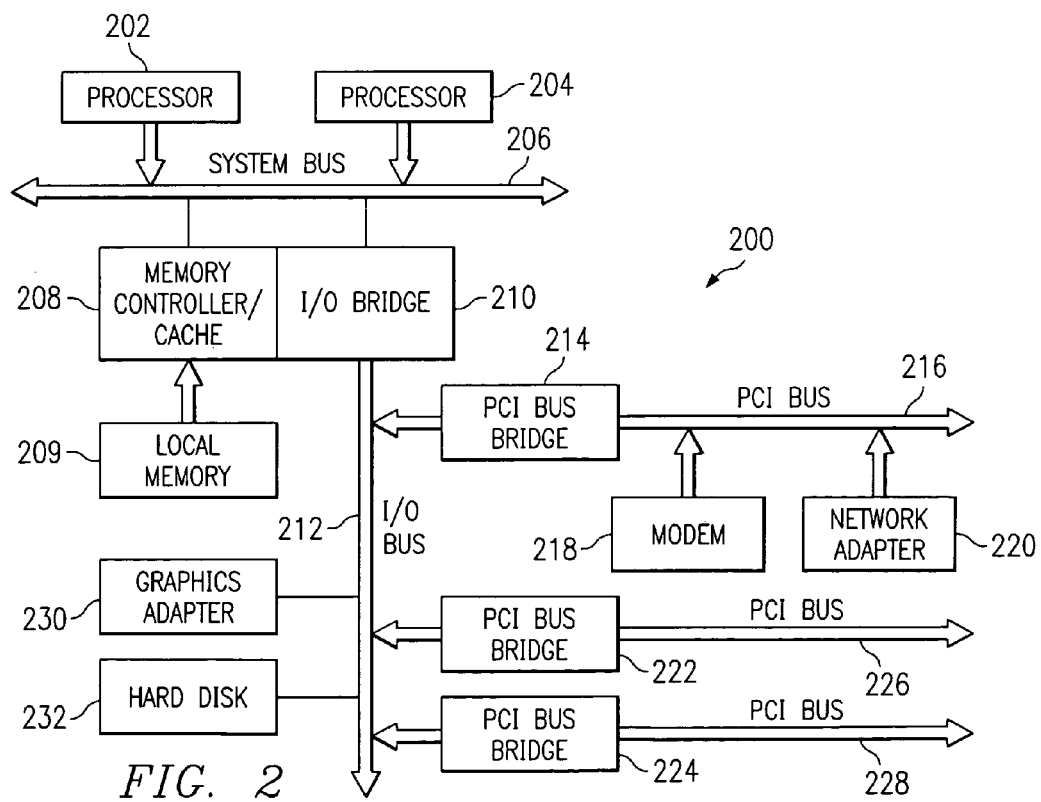
FIG. 2 is an exemplary block diagram illustrating a server device according to one embodiment of the present invention.

Referring to FIG. 2, a block diagram of a data processing system that may be implemented as a server, such as servers 108–112 or a proxy server on which the ETA based marketplace provider 114 may be resident, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 maybe integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
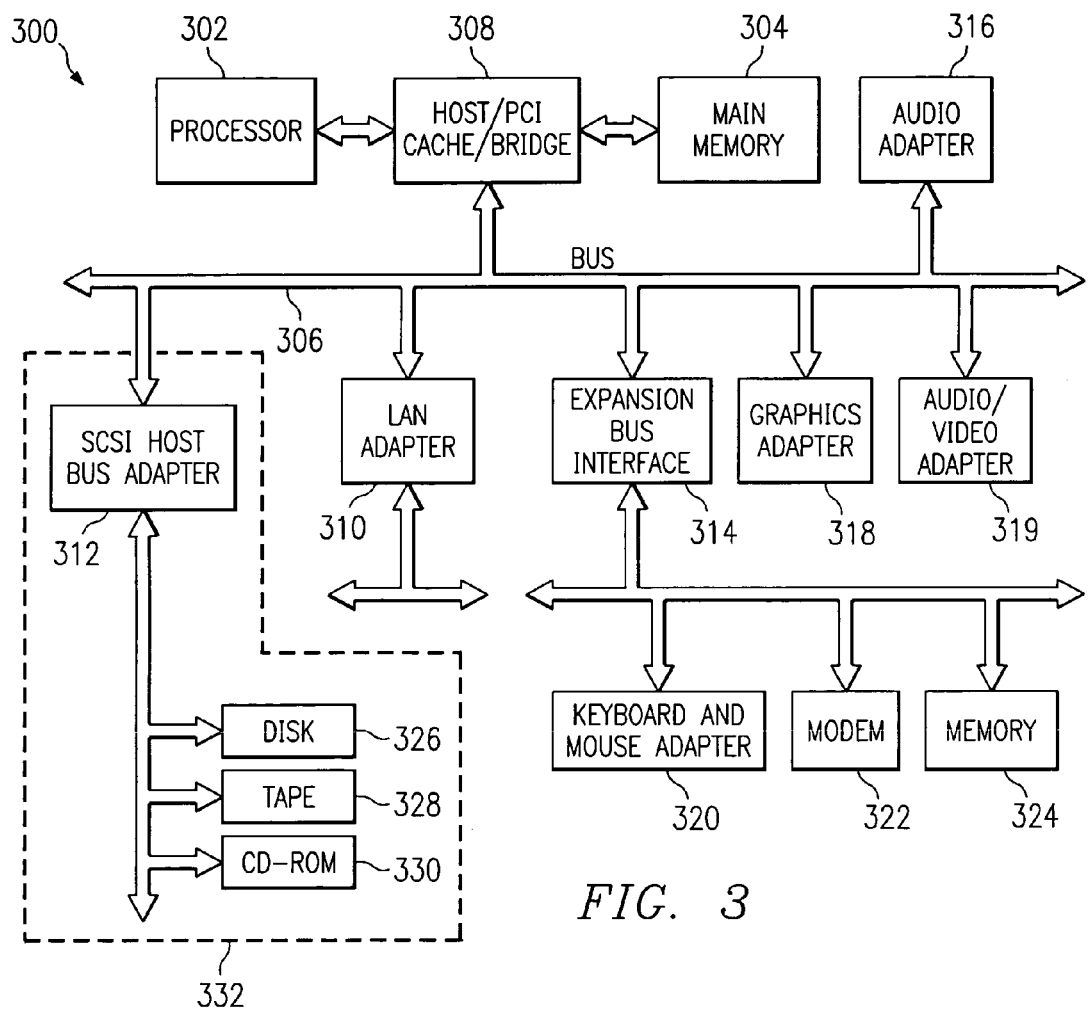
FIG. 3 is an exemplary block diagram illustrating a client device according to one embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
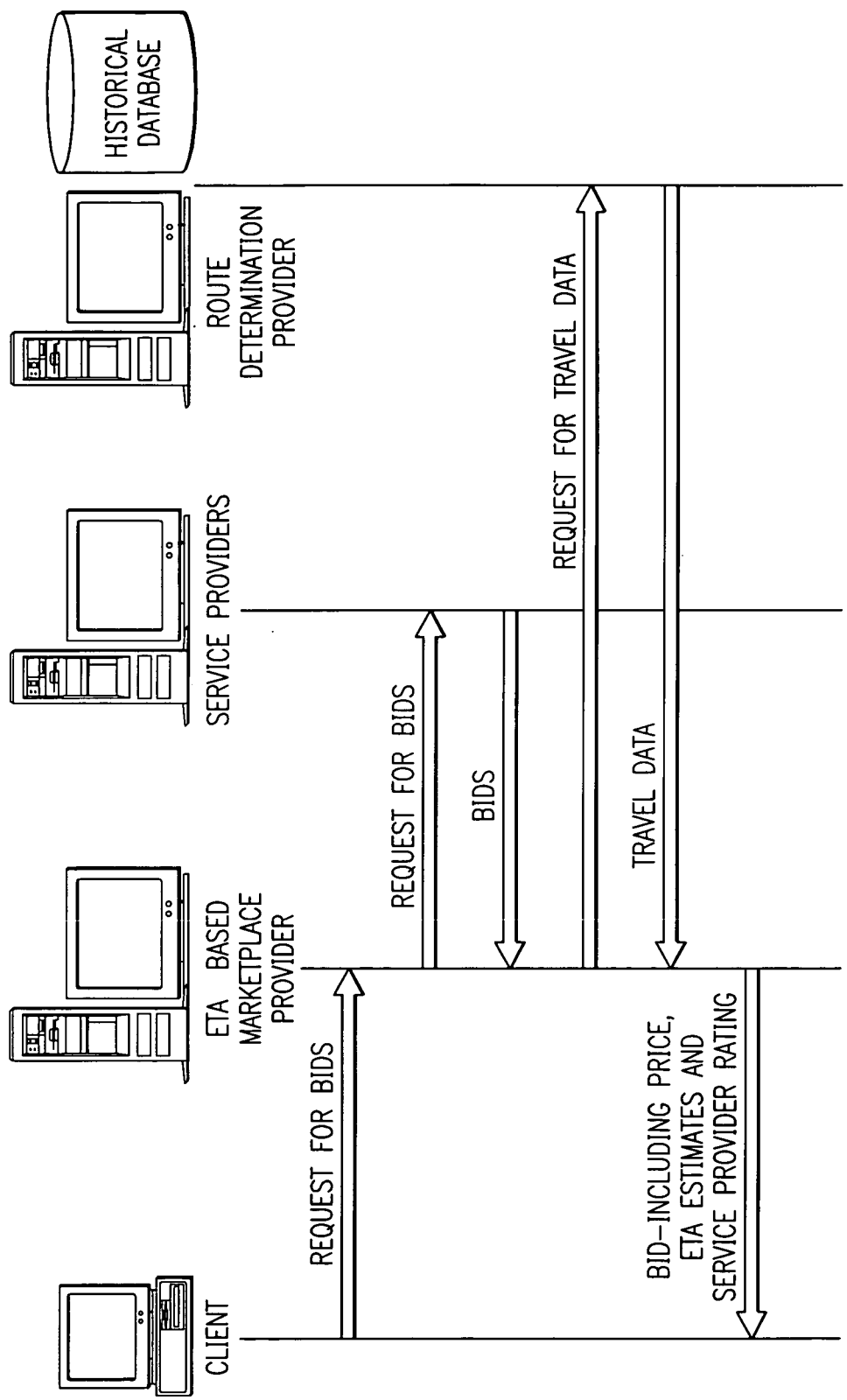
FIG. 4 is an exemplary block diagram illustrating data message flow according to one embodiment of the present invention.

FIG. 4 is an exemplary data message flow diagram illustrating the data messages transmitted between the various elements in the network data processing system 100. As shown in FIG. 4, the client communicates with the ETA based marketplace provider that acts as a proxy to service providers. The ETA based marketplace provider solicits bids from the service providers on behalf of the client and obtains ETA estimates from ETA data providers, such as a route determination provider and a travel data historical database. The ETA based marketplace provider then provides the client with service search results that include the identities of the service providers, the price of obtaining the requested service from the various service providers, the ETA estimates for the various service providers, and a service provider rating. In this way, a user of the client device is provided with more information than just price for making a decision as to from which service provider he/she wishes to obtain a requested service.

Thus, with the present invention, the client 410 issues a request for bids for a requested service to the ETA based marketplace provider 420, in a manner generally known in the art. For example, a user of client 410 may enter a Uniform Resource Locator (URL) associated with a Web page resident on ETA based marketplace provider 420 into a web browser application on the client 410. The user may then enter search information for searching for one or more service providers that provide a requested service. For example, a user may enter a search query for a service provider that provides pizza delivery of a large pepperoni pizza.

The ETA based marketplace provider 420 may then search its registry of service providers to identify service providers that provide the requested service. The search for registered service providers to provide the requested service may be based on the requested service identified by the user of the client 410 as well as geographical location information for a location associated with the client 410. The geographical location information may be obtained, for example, by prompting the user to enter his/her geographical location or a location at which the requested service is to be performed or the results delivered. In this way, service providers that have multiple locations may have an appropriate location close to the location where the requested service is to be performed or close to the location at which the results of the requested service are to be delivered, may be selected.

The ETA based marketplace 420 may then send requests to the identified service providers 430 using address information stored in the service provider registry. The requests identify the requested service along with any other pertinent information for obtaining a bid from the service providers 430. Alternatively, rather than sending a request to the service providers 430, the ETA based marketplace provider 420 may rely on stored profile information for the identified service providers 430 that may provide, for example, location information, price information, and estimated time of completing the requested service at the service provider's associated location. For purposes of the following description, however, it will be assumed that the ETA based marketplace provider 420 solicits bids from the service providers 430.

After receiving the request from the ETA based marketplace provider 420, the service providers 430 may then generate a bid for providing the service to the client 410. The bids will typically include an identification of the price for providing the requested service. The bids may include further information including an estimated time for completion of the requested service at the service provider location. That is, for example, the bid may include a price along with an estimate that it will take approximately 10 minutes to make the pepperoni pizza at the service provider's associated location. This time estimate may be based, for example, on current workloads, backlog, equipment readiness, staffing, and the like.

The bids generated by the service providers 430 are then transmitted back to the ETA based marketplace provider 420. The ETA based marketplace provider 420 compiles the bids, identifies the service providers 430 submitting the bids, and identifies a physical location associated with the service providers 430. In addition, the ETA based marketplace provider 420 identifies a location associated with the client 410. The location associated with the client 410 may be determined by requesting the user of the client 410 to enter the location information when placing the requested service search request, or may be obtained from a user profile stored on the ETA based marketplace provider 420 that has been established for a user of the client 410.

The ETA based marketplace provider 420 may then obtain ETA estimates for providing the requested service from ETA estimate data provider 440. In the depicted example, ETA estimate data provider includes a route determination provider and travel data historical database. However, the present invention is not limited to determining ETA based on physically traveling between a client associated location and a service provider associated location. Rather the ETA estimate may be any type of estimate of the time it will take to provide a requested service to a client. Thus, for example, the ETA estimate may be an estimate of the time it will take to perform the service and transmit the results of the service to the client. In the presently described exemplary embodiment, however, it will be assumed that the ETA estimate is based on physical travel between a client location and a service provider location.

Thus, in the depicted example, the ETA based marketplace provider may retrieve route and travel data from travel data providers 440 based on the associated locations of the service providers 430 and the client 410. Route determination is generally known in the art and consists of identifying preferred routes between two locations taking into consideration various travel conditions including traffic congestion, travel times, travel distances, and the like. The travel data providers 440 may include a route determination provider and travel data historical database, for example.

From this travel data, an estimated time of travel may be calculated. The estimated time of travel, for example, may be determined by identifying an optimal travel route, calculating a time of travel for each leg of the optimal travel route taking into consideration traffic congestion and other factors affecting travel time, applying corrections to the estimated time of travel for each leg based on historical data, and summing the travel times for each leg of the route.

The estimated time of travel may then be added to any time factors provided in the service provider's bid. Thus, for example, if the service provider indicated in the bid that it will take approximately 10 minutes to prepare the large pepperoni pizza, this 10 minutes may be added to an estimated 20 minute travel time to arrive at an estimated ETA of 30 minutes.

In addition to the estimated ETA for providing the service, with some services it may be practical for the user of the client device 410 to travel to the location of the service provider 430. In such cases, the ETA based marketplace provider 420 may further calculate an estimated ETA for the user to travel to the service provider 430. If the estimated ETA for traveling to the service provider 430 is less than a time provided in the bid for performing the requested service, the larger of the two times may be selected as the estimated ETA for traveling to the service provider 430 and obtaining the requested service.

For example, the ETA based marketplace provider 420 may calculate, based on route and historical travel data, that it will take the user of client 410 approximately 20 minutes to travel to the service provider's location. However, the service provider 430 may have indicated in the bid that it would take 30 minutes to perform the requested service at the service provider's location. As a result, if performance of the requested service were begun at the same time that the user of client 410 were to begin traveling to the service provider's location, the user would arrive at the location and have to wait for the service provider to complete performance of the requested service. Thus, the longer of the two time estimates is a more accurate reflection of the actual ETA for completion of the requested service should the user of the client 410 decide to travel to the service provider's location.

Once the estimated ETA is calculated, the ETA based marketplace provider 420 may provide search results to the client 410 identifying the service providers that responded with bids, corresponding prices for providing the service, and an estimated ETA for providing the service. In addition, the estimated ETA for providing the service should the user of the client 410 choose to travel to the service provider location may be provided. The user of the client 410 may then select a service provider from the search results and initiate an order for the requested service. The order may be placed in a manner similar to that generally used by a number of electronic businesses. For example, a "shopping cart" mechanism may be utilized to place and manage an order, as is generally known in the art.

In addition to the information described above, the ETA based marketplace provider 420 may retrieve, from a database for example, service provider rating information. The service provider rating information may provide an indication of whether or not the estimated ETAs for the service provider are accurate. That is, the service provider rating may indicate how often the service provider meets the estimated ETAs and how often the service provider does not meet the estimated ETA. If a service provider has a low service provider rating, it may indicate that the service provider generally does not complete the requested service within the estimated ETA. If the service provider has a relatively high service provider rating, it may indicate that the service provider generally does complete the requested service within the estimated ETA.

The service provider rating may be determined based on user feedback obtained from, for example, questionnaires sent to users of clients 410 that have made use of the ETA based marketplace provider. Such questionnaires may be of the electronic form, such as by sending an electronic mail message to the client 410 requesting numerical rankings of various aspects of the service provider, traditional mail based questionnaire forms, or the like. Information obtained from the questionnaires may be input to the ETA based marketplace provider 420 and used to adjust a service provider rating for a service provider.

Thus, the present invention provides an estimated time of arrival based electronic marketplace that provides potential customers with estimated times of service completion along with other bid information in order to make an informed decision as to with which service provider to place an order. In addition, the present invention may provide a service provider rating to further inform a user of a client device as to the likelihood that the service provider will meet the estimated ETAs. In this way, a user may weigh cost versus delay in having the requested service completed.

Figure 5:
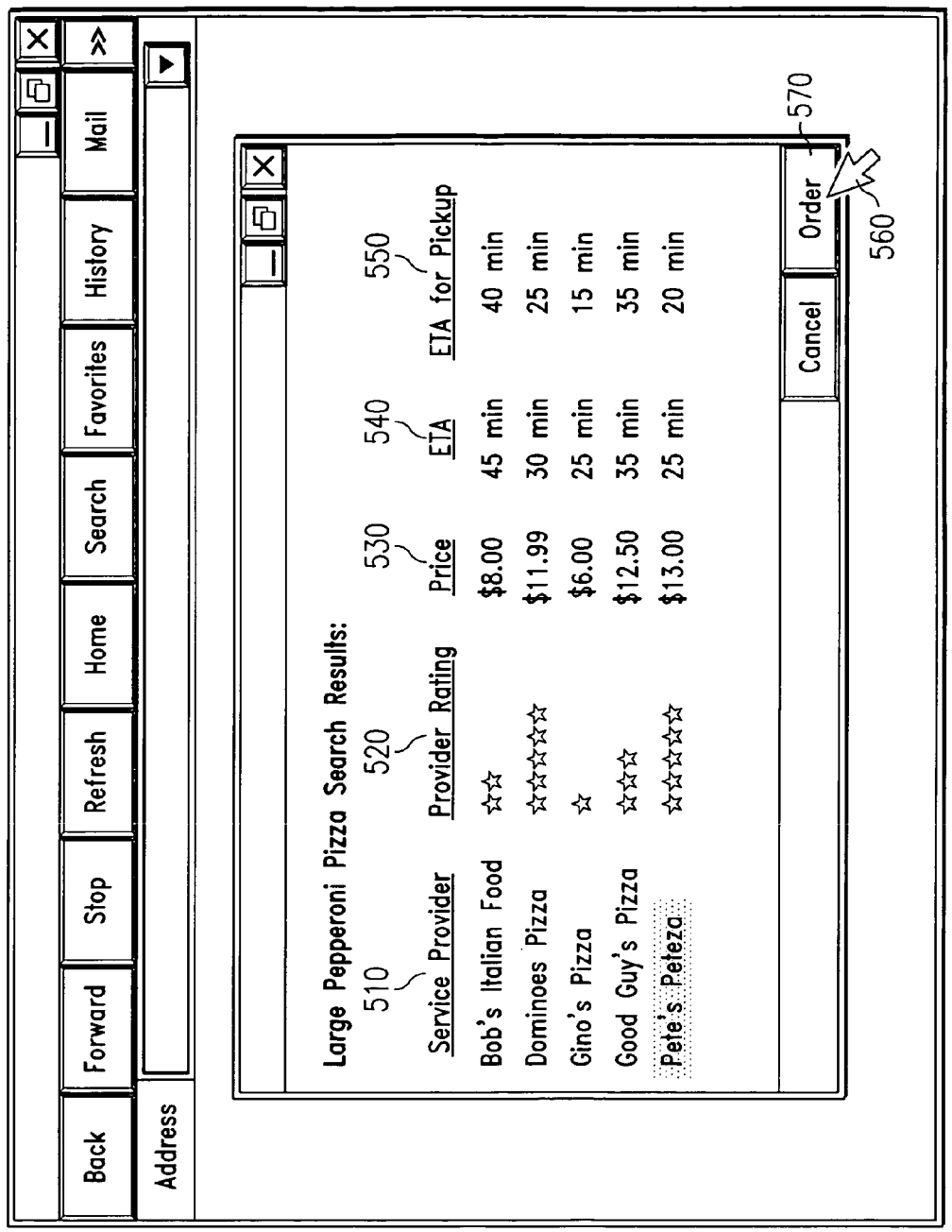
FIG. 5 is an exemplary diagram of a display of ETA based marketplace search results on a client device according to one embodiment of the present invention.

FIG. 5 is an exemplary diagram illustrating requested service search results that may be presented to a user at a client device. As shown in FIG. 5, the search results include a listing of the service provider 510, a corresponding service provider rating 520, a price 530 for performing the requested service, an estimated ETA 540 for completion of the requested service, and an estimated ETA 550 for completion of the requested service should the user choose to travel to the location associated with the service provider.

From the search results presented in the manner shown in FIG. 5, a user may select a service provider to provide the requested service. For example, a user may review the search results, determine that Pete's Peteza is the most desirable service provider to provide the requested service, and select Pete's Peteza to supply the requested service using a pointing device and the graphical cursor 560. The decision to use Pete's Peteza may be based on the price information, estimated ETA information, and the service provider ratings provided in the search results. Pete's Peteza may be chosen by a user because, for example, the cost is only slightly higher than the other service providers, the estimated ETA is less than the majority of other service providers, and Pete's Peteza has a very good service provider rating (five stars out of five). Likewise, Gino's Pizza may not be selected by a user because, while Gino's is the cheapest of all the service providers and has a relatively short estimated ETA, Gino's does not have a very good service provider rating and the likelihood is that Gino's will not perform the requested service within the estimated ETAs.

Once a service provider is selected, the user of the client device may select a virtual button 570 to place an order to have the requested service performed by the selected service provider. By selecting the virtual order button 570, an order message is transmitted from the client device to the ETA based marketplace provider. The ETA based marketplace provider then performs any necessary processing on the order message, such as reformatting the message for use by the service provider, and transmits the order message to the service provider. The service provider then processes the received order in a manner generally known in the art. The particular manner by which the service provider processes the received order will vary depending the particular service provider.

Figure 6:
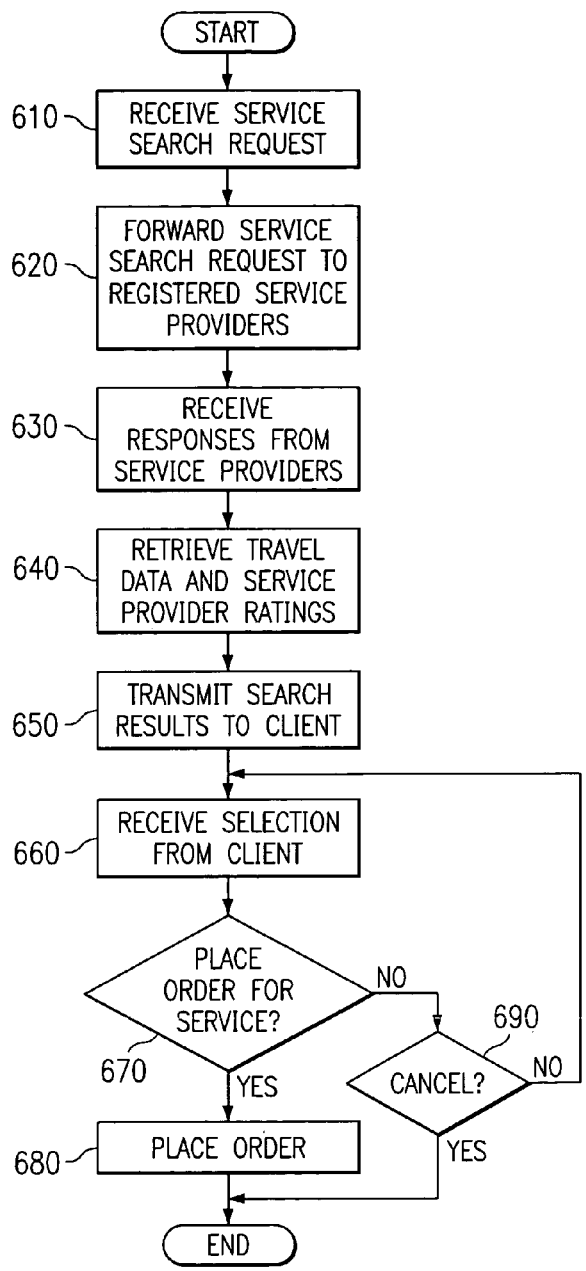
FIG. 6 is a flowchart outlining an exemplary operation of the present invention when processing a search request for a service according to the present invention.

FIG. 6 is a flowchart outlining an exemplary operation of the present invention when processing a service search request. As shown in FIG. 6, the operation starts with receipt of a service search request from a client device (step 610). Registered service providers that provide the requested service are identified and the service search request is forwarded to the registered service providers that are identified (step 620). Responses from the service providers are received (step 630) and travel data and service rating data are retrieved (step 640).

From the travel data, estimated ETAs are determined and search results including these estimated ETAs are transmitted to the client device (step 650). A selection of a service provider is then received from the client device (step 660) and a determination is made as to whether or not an order is to be placed (step 670). If so, the order is placed with the service provider (step 680). If not, a determination is made as to whether the user of the client device has selected a cancel operation (step 690). If not, the operation returns to step 660 and awaits further selections from the user of the client device. If the cancel operation has been selected, the operation ends.

Figure 7:
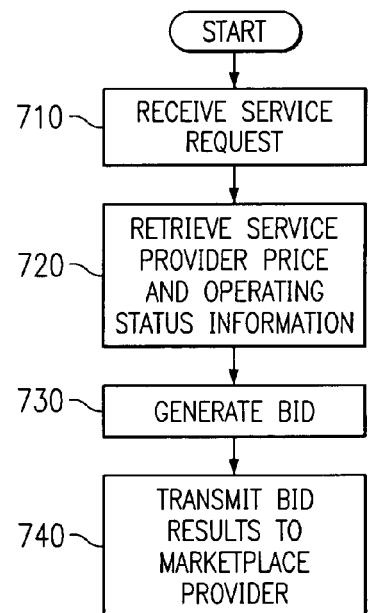
FIG. 7 is a flowchart outlining an exemplary operation of a service provider when generating a bid to be transmitted to the marketplace provider according to the present invention.
Figure 7:
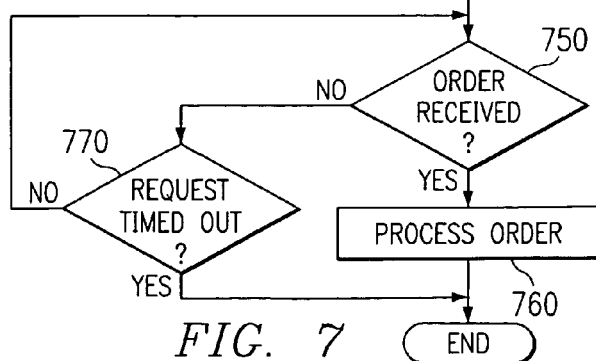

FIG. 7 is a flowchart outlining an exemplary operation of a service provider according to the present invention when processing a request for bids, i.e. a service search request. The operation starts with receiving a service search request (step 710). Service provider price and operating status information are retrieved (step 720) and a bid is generated (step 730). The bid may include the price for providing the requested service as well as an indication of an estimated time for performing the requested service at the service provider's associated location, for example.

The bid is transmitted to the marketplace provider (step 740) and a determination is made as to whether an order is received (step 750). If an order is received, the order is processed (step 760) in a manner specific to the service provider's order system. If an order is not received, a determination is made as to whether the service search request has timed out (step 770). If not, the operation returns to step 750 and awaits an order being placed. If the service search request has timed out, the operation then ends.

Thus, the present invention provides a virtual electronic marketplace through which a user of a client device, i.e. a customer, may obtain information regarding service providers that provide a requested service. The information regarding the service providers may include not only the price charged for performing the requested service but also an estimated time for completing the requested service and a service provider rating. In this way, a potential customer may make a more informed decision as to which service provider to use by weighing cost versus delay versus likelihood of increased delay.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art.

For example, while the present invention has been described in terms of the ETA based marketplace provider calculating an estimated ETA for providing the requested service, the invention is not limited to such. Rather, the ETA based marketplace provider may provide location information for the client device to service providers in the request for bids. This location information may then be used by the service providers to generate estimated times for completion of the requested service in a manner similar to that described above with regard to the ETA based marketplace provider. The service providers may then respond to the ETA based marketplace provider with bids that include an estimated ETA for completion of the requested service. The ETA based marketplace provider may then forward these bids to the client device in the manner described above. In this way, the burden of determining an ETA for each service provider is shifted from the ETA based marketplace provider to the service providers themselves.

Other embodiments and modifications may be made without departing from the spirit and scope of the present invention. The embodiments above were chosen and described in order to best explain the principles of the invention, the practical application, and to enable others of ordinary skill in the art to understand the invention for various embodiments with various modifications as are suited to the particular use contemplated.

What is claimed is:

1. A method of providing service provider information to a client device in a distributed computer system, comprising:
   obtaining bids from a plurality of service providers for providing a service;
   responsive to obtaining the bids, obtaining route information from a route determination provider based on a first location associated with the client device and a second location associated with a corresponding service provider;
   obtaining historical travel data from a historical database;
   calculating an estimated time of travel for each of the plurality of service providers based on the route information and the historical travel data;
   electronically determining an estimated time of completion for the service for each of the plurality of service providers based on the calculated estimated time of travel for each of the plurality of service providers; and
   providing the bids from the plurality of service providers and the estimated time of completion for the service for each of the plurality of service providers to the client devices, wherein the each bid includes a price for providing the service, wherein the each bid further includes an estimated time to perform the service at the second location, and wherein determining an estimated time of completion for the service for each of the plurality of service providers comprises adding the estimated time of travel to the estimated time to perform the service at the second location.

2. The method of claim 1, further comprising:
   determining a service provider rating for each of the plurality of service providers; and
   providing the service provider rating for each of the plurality of service providers to the dient device.

3. The method of claim 1, further comprising:
   receiving a selection of a selected service provider from the plurality of service providers and a command to place an order for the service with the selected service provider, and
   placing an order with the selected service provider.

4. The method of claim 1, wherein the method is implemented in an electronic marketplace provider.

5. The method of claim 4, wherein the electronic marketplace provider is present on a proxy server.

6. The method of claim 4, wherein the electronic marketplace provider is present on the client device.

7. An apparatus for providing service provider information to a client device in a distributed computer system, comprising:
   a first interface which obtains bids from a plurality of service providers for providing a service;
   a processor which, responsive to obtaining the bids, obtains route information from a route determination provider based on a first location associated with the client device and a second location associated with a corresponding service provider, obtains historical travel data from a historical database, calculates an estimated time of travel for each of the plurality of service providers based on the route information and the historical travel data, and determines an estimated time of completion for the service for each of the plurality of service providers based on the calculated estimated time of travel for each of the plurality of service providers; and
   a second interface which provides the bids from the plurality of service providers and the estimated time of completion for the service for each of the plurality of service providers to the client device, wherein each bid includes a price for providing the service, wherein each bid further includes an estimated time to perform the service at the second location, and wherein the processor adds the estimated time of travel to the estimated time to perform the service at the second location.

8. The apparatus of claim 7, wherein the processor determines a service provider rating for each of the plurality of service providers and the second interface provides the service provider rating for each of the plurality of service providers to the client device.

9. The apparatus of claim 7, further comprising:
   a third interface which receives a selection of a selected service provider from the plurality of service providers and a command to place an order for the service with the selected service provider; and
   a fourth interface which places an order with the selected service provider.

10. The apparatus of claim 7, wherein the apparatus is a part of an electronic marketplace provider.

11. The apparatus of claim 10, wherein the electronic marketplace provider is present on a proxy server.

12. The apparatus of claim 10, wherein the electronic marketplace provider is present on the client device.

13. A computer program product in a computer readable medium for providing service provider information to a service consumer in a distributed computer system, comprising:
   instructions for obtaining bids from a plurality of service providers for providing a service;
   instructions, responsive to obtaining the bids, for obtaining route information from a route determination provider based on a first location associated with the client device and a second location associated with a corresponding service provider;
   instructions for obtaining historical travel data from a historical database;
   instructions for calculating an estimated time of travel for each of the plurality of service providers based on the route information and the historical travel data;

instructions for determining an estimated time of completion for the service for each of the plurality of service providers based on the calculated estimated time of travel for each of the plurality of service providers; and instructions for providing the bids from the plurality of service providers and the estimated time of completion for the service for each of the plurality of service providers to a service consumer, wherein each bid includes a price for providing the service, wherein each bid further includes an estimated time to perform the service at the second location, and wherein the instructions for determining an estimated time of completion for the service for each of the plurality of service providers comprises instructions for adding the estimated time of travel to the estimated time to perform the service at the second location.

14. The computer program product of claim 13, further comprising:

instructions for determining a service provider rating for each of the plurality of service providers; and instructions for providing the service provider rating for each of the plurality of service providers to the service consumer.

15. The computer program product of claim 13, further comprising:

instructions for receiving a selection of a selected service provider from the plurality of service providers and a command to place an order for the service with the selected service provider; and instructions for placing an order with the selected service provider.

16. The computer program product of claim 13, wherein the computer program product is executed in an electronic marketplace provider.

17. The computer program product of claim 16, wherein the electronic marketplace provider is present on a proxy server.

18. The computer program product of claim 16, wherein the electronic marketplace provider is present on the client device.

* * * * *